April 29, 1924.
R. B. FAGEOL
1,492,207
AUTOMOBILE BUMPER
Filed Jan. 31, 1923
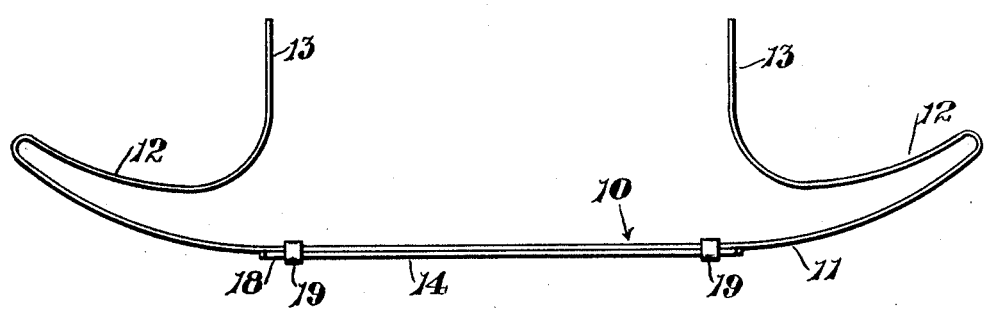
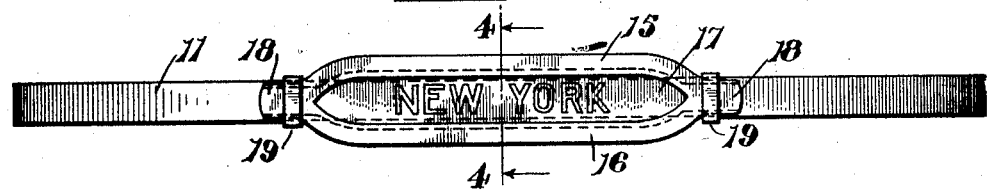
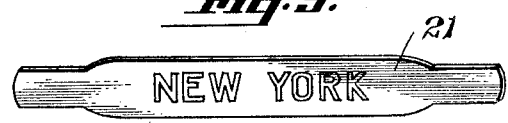
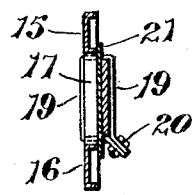
INVENTOR.
ROLLIE B. FAGEOL.
BY Dewey, Strong
Townsend & Loftus
ATTORNEYS.

Patented Apr. 29, 1924.

1,492,207

UNITED STATES PATENT OFFICE.

ROLLIE B. FAGEOL, OF OAKLAND, CALIFORNIA, ASSIGNOR TO AMERICAN CHAIN COMPANY, INC., OF BRIDGEPORT, CONNECTICUT, A CORPORATION OF NEW YORK.

AUTOMOBILE BUMPER.

Application filed January 31, 1923. Serial No. 616,072.

*To all whom it may concern:*

Be it known that I, ROLLIE B. FAGEOL, a citizen of the United States, residing at Oakland, county of Alameda, and State of California, have invented new and useful Improvements in Automobile Bumpers, of which the following is a specification.

This invention relates to an automobile bumper, and particularly pertains to means for increasing the central impact area of the bumper, and for providing a name plate structure.

It is now becoming common practice among automobile owners to equip their cars with name plates which indicate the town of which the owner of the vehicle is a resident. It is the principal object of the present invention to provide means adapted to be carried by an automobile bumper, and by which such an indicia plate may be carried, the structure having the additional advantage of supplying the bumper with a central increased impact area.

The present invention contemplates the use of an enlarged plate structure adapted to be detachably secured to the front of an automobile bumper, especially of that type of bumper known as a loop end spring bar bumper, and which structure forms a support for interchangeable name plates.

The invention is illustrated by way of example in the accompanying drawings, in which:

Fig. 1 is a view in plan showing a bumper fitted with the present invention.

Fig. 2 is a view in front elevation showing the bumper, and particularly disclosing the name plate and the increased impact area member.

Fig. 3 is a view in front elevation showing a name plate which might be used in the present invention.

Fig. 4 is a view in transverse section through the bumper as seen on the line 4—4 of Fig. 2.

Referring more particularly to the drawing, 10 indicates a bumper structure comprising a transverse impact bar 11 provided with looped end portions 12, said end portions being bent inwardly to extend along the back of the bar for a distance and then extending rearwardly to form mounting brackets 13. Secured against the front of the impact bar 11 is a combined name plate frame and increased impact area member 14. As more particularly shown in Fig. 2, the member 14 is formed of parallel rails 15 and 16, spaced in relation to each other to provide a display opening 17. It is desirable that the width of the display opening shall not be greater than the face of the bar 11, to which the structure is secured.

Referring more particularly to Fig. 4, it will be seen that the member 14 is preferably formed of pressed metal, the rails 15 and 16 being of channel shape. The opposite ends of the rails converge and form a fastening projection 18 which conforms to the front face of the bumper bar and affords means by which the entire plate structure 14 may be held in position. This is done by clamps 19 which embrace the projections 18 and may be secured around the bar 11. If desired, the clamps may be in the shape of simple slip rings, although it may be found preferable to provide tightening bolts 20 to grip the flanges of the rings and more rigidly secure them around the projections and the bar. A name plate 21 is interposed between the front face of the bumper bar 11 and the rear face of the impact member 14. This plate may carry any desired inscription which will be displayed through the opening 17 in the impact member 14. The plate is wide enough to completely fill the display opening 17 and to overlap the marginal edges thereof. The opposite ends of the plate are reduced in size to fit them to extend through the fastening members 19 and to assume substantially concealed position in the rear of the projections 18 at the opposite ends of the impact member 14.

In applying the present invention to a bumper, the name plate 21 is placed against the front face of the bumper bar 11, after which the impact member 14 is placed thereover, with its projecting ends 18 in register with the bumper bar 11. The fastening members 19 may then be disposed around the bumper bar and the projections 18, thereafter being clamped to rigidly hold the name plate and the impact member 14 against movement and in an aligned position on the front of the bumper bar.

It will be evident that with this structure the central portion of the bumper bar 11 will be given a widened impact area, which is desirable for the protection of the automobile radiator and other vital parts of the machine disposed between the frame members. At the same time a suitable mounting will be afforded for a plate upon which any desired indicia may be pressed or otherwise inscribed.

It will thus be seen that the device here disclosed makes it possible to readily provide a single bar bumper with a central increased impact area, and at the same time to afford means for displaying desired indicia in a convenient and prominent place upon a vehicle.

While I have shown the preferred form of my invention as now known to me, it will be understood that various changes may be made in the combination, construction and arrangement of parts by those skilled in the art, without departing from the spirit of the invention as claimed.

Having thus described my invention, what I claim and desire to secure by Letters Patent is:

1. In combination with an automobile bumper, a removable name plate and a frame member securing said plate in a display position at the front of the bumper, said frame member providing an increased impact area for the bumper.

2. In combination with a bumper bar extending transversely of a vehicle, a name plate having end portions of a width substantially equal to that of the bumper bar, and a combined frame member for said plate and increased impact area member for the bumper having reduced end portions and clamping means embracing the bumper bar and the reduced portions of the name plate and the frame member whereby said members may be held in a rigid position on the front of said bar.

3. In combination with an automobile bumper and a name plate therefor, a frame member adapted to extend across the central portion of the bumper and serving to form a central impact member of greater width than the bumper and at the same time to provide a frame and clamping means for the name plate, and means for simultaneously holding the increased impact frame member and the name plate on the front of the bumper.

ROLLIE B. FAGEOL.